United States Patent
Connolly et al.

(10) Patent No.: US 8,418,163 B2
(45) Date of Patent: Apr. 9, 2013

(54) STACKED HARDWARE ABSTRACTION LAYER METHODS FOR MAINTAINING SOFTWARE/HARDWARE BACKWARD COMPATIBILITY

(75) Inventors: Matthew W. Connolly, Canton, GA (US); Mark E. Lavergne, Lilburn, GA (US); Boris Altshul, Marietta, GA (US)

(73) Assignee: Ciena Corporation, Hanover, MD (US)

( * ) Notice: Subject to any disclaimer, the term of this patent is extended or adjusted under 35 U.S.C. 154(b) by 1049 days.

(21) Appl. No.: 12/103,833

(22) Filed: Apr. 16, 2008

(65) Prior Publication Data

US 2009/0265698 A1    Oct. 22, 2009

(51) Int. Cl.
*G06F 9/44* (2006.01)
*G06F 1/24* (2006.01)

(52) U.S. Cl. ......... 717/168; 713/100; 717/170; 717/172

(58) Field of Classification Search ................. 717/171, 717/168
See application file for complete search history.

(56) References Cited

U.S. PATENT DOCUMENTS

| | | | | |
|---|---|---|---|---|
| 6,031,867 A * | 2/2000 | Johnson et al. | ............... | 375/222 |
| 7,055,148 B2 * | 5/2006 | Marsh et al. | .................. | 717/172 |
| 7,178,141 B2 * | 2/2007 | Piazza | .......................... | 717/168 |
| 7,328,434 B2 * | 2/2008 | Swanson et al. | ............... | 717/168 |
| 7,430,735 B1 * | 9/2008 | Balakrishnan et al. | ........ | 717/173 |
| 7,562,358 B2 * | 7/2009 | Bennett et al. | ................. | 717/170 |
| 7,761,543 B2 * | 7/2010 | Hyndman et al. | ............ | 709/223 |
| 7,930,691 B2 * | 4/2011 | Bhattacharya et al. | ........ | 717/171 |
| 7,971,199 B1 * | 6/2011 | Chen | ............................. | 717/168 |
| 2004/0103282 A1 * | 5/2004 | Meier et al. | .................... | 713/171 |
| 2006/0248329 A1 * | 11/2006 | Swanson et al. | .............. | 713/100 |
| 2007/0186752 A1 * | 8/2007 | Georges et al. | ................. | 84/609 |
| 2008/0313228 A1 * | 12/2008 | Clark et al. | ................. | 707/104.1 |
| 2009/0013210 A1 * | 1/2009 | McIntosh et al. | ................. | 714/4 |
| 2010/0031804 A1 * | 2/2010 | Chevreau et al. | .............. | 84/609 |
| 2012/0005480 A1 * | 1/2012 | Batke et al. | .................... | 713/175 |

* cited by examiner

*Primary Examiner* — Don Wong
*Assistant Examiner* — Mohammad Kabir
(74) *Attorney, Agent, or Firm* — Clements Bernard PLLC; Christopher L. Bernard; Lawrence A. Baratta, Jr.

(57) ABSTRACT

In various exemplary embodiments, the present invention provides methods for maintaining software/hardware backward compatibility across multiple versions in a modular and scalable manner. More specifically, the present invention provides, stacked hardware abstraction layer methods for maintaining software/hardware backward compatibility for networking equipment and the like.

20 Claims, 8 Drawing Sheets

STACKED HARDWARE ABSTRACTION LAYER METHODS FOR MAINTAINING SOFTWARE/HARDWARE BACKWARD COMPATIBILITY

FIELD OF THE INVENTION

The present invention relates generally to methods for maintaining software/hardware backward compatibility for networking equipment and the like. More specifically, the present invention relates to stacked hardware abstraction layer methods for maintaining software/hardware backward compatibility for networking equipment and the like.

BACKGROUND OF THE INVENTION

For complex systems, such as networking equipment and the like, maintaining backward compatibility between software and firmware is difficult. In some cases, only one release, or point release, of backward compatibility is supported and great pains are taken in the system design to accomplish this. In many cases, backward compatibility is not supported at all, and software and firmware must be upgraded together. Complex upgrade procedures are often required and traffic is interrupted. Such is the case for Cisco Multiprotocol Label Switching (MPLS) networks, for example.

Upgradeable firmware has become particularly important for the next generation of switching equipment. Field programmable devices, i.e. Field Programmable Gate Arrays (FPGAs), are frequently used for network interfaces in transport equipment. Being able to upgrade the firmware in the field has become a requirement and will be commonplace as new features and bug fixes are added to the hardware.

In cases where backward compatibility is not supported, software and firmware must be upgraded together in order to make a system fully operational. For some networking equipment and the like, traffic is not interrupted by a software upgrade alone. However, a firmware upgrade will always result in a traffic interruption if a given device is in the data path. Because software upgrades operate on all equipment in a network element at the same time, firmware upgrades must also operate on all equipment in the network element concurrently. If the given devices are in the data path, the worst case scenario results in all network interfaces being out of service for the duration of the upgrade. This is highly undesirable, as the only way to maintain service is to switch all traffic to a different network element—something that is not always possible, and is never desirable. Backward compatibility solves this problem, as devices may be upgraded one at a time and traffic may be switched to protect network interfaces during the upgrade process.

Thus, backward compatibility is always desirable and complex software designs are often employed. Typically, this involves maintaining a hardware abstraction layer that may interface a new software application layer to both old and new versions of the firmware. Maintaining relationships between object and driver code for multiple firmware versions is complex and limits the number of firmware versions with which backward compatibility may be achieved. A customer will often desire an upgrade that jumps more than one release. If only one level of backward compatibility is maintained, the upgrade must be done in stages—for example, going from version 1.0 to version 3.0 may require first installing version 2.0. This makes the process long and complex, and increases the chances that something will go wrong in the network.

It is therefore desirable to have a method of maintaining backward compatibility to multiple firmware releases without making the hardware abstraction layer overly complex.

BRIEF SUMMARY OF THE INVENTION

In various exemplary embodiments, the present invention provides methods for maintaining software/hardware backward compatibility across multiple versions in a modular and scalable manner. More specifically, the present invention provides, stacked hardware abstraction layer methods for maintaining software/hardware backward compatibility for networking equipment and the like.

In one exemplary embodiment, the present invention provides a stacked hardware abstraction layer method for maintaining software/hardware backward compatibility for networking equipment and the like, the method including: given application software and a hardware abstraction layer associated with a newer release and a device including firmware associated with an older release, providing one or more shadow hardware abstraction layers for each intervening release; transferring messages that are supported by the older release between the application software and the device through the one or more shadow hardware abstraction layers; filtering messages that are not supported by the older release between the application software and the device at the one or more shadow hardware abstraction layers; and thereby upgrading the firmware of the device to the newer release. The filtered messages that are not supported by the older release return an exception value to the application software and the hardware abstraction layer associated with the newer release.

In another exemplary embodiment, the present invention provides a method for the upgrade of firmware on one or more circuit packs, the method including: performing a general software release upgrade of a network element comprising one or more circuit packs, wherein the general software release upgrade comprises loading firmware images on one or more modules; booting the one or more circuit packs; checking firmware on the one or more circuit packs; for circuit packs of the one or more circuit packs with a firmware revision below the general software release upgrade, running one or more shadow hardware abstraction layers to communicate between each of the circuit packs and the network element; and raising a firmware mismatch for each of the circuit packs with a firmware revision below the general software release upgrade. The method also includes transferring messages that are supported by the circuit packs with a firmware revision below the general software release upgrade between upgraded application software on the network element and the circuit packs through the one or more shadow hardware abstraction layers; and filtering messages that are not supported by the circuit packs with a firmware revision below the general software release upgrade between the upgraded application software and the circuit packs at the one or more shadow hardware abstraction layers. The filtered messages that are not supported by the circuit packs with a firmware revision below the general software release return an exception value to the application software. The method further includes operating the circuit packs with a firmware revision below the general software release upgrade with limited availability on traffic facilities. The method still further includes upgrading firmware on each of the circuit packs of the one or more circuit packs with a firmware revision below the general software release upgrade to a firmware revision associated with the general software release upgrade. The method still further includes removing the firmware mismatch condition that persists following the upgrading firmware step. The upgrading firmware step includes preparing for installation of the firmware revision associated with the general software release upgrade; installing a primary image on a target device comprising one of the circuit packs of the one or more circuit packs with a firmware revision below the general software release upgrade; and if the installing a primary image fails, raising an alarm, loading a secondary image on the target device, and operating the target device with a firmware mismatch and the one or more shadow hardware abstraction layers; and loading the primary image on the target device. The upgrading firmware step also includes: provisioning the target device with parameters persisted from a previous configuration; and running a hardware abstraction layer associated with the general software release upgrade.

In a further exemplary embodiment, the present invention provides a rolling upgrade method for firmware on one or more circuit packs in a network element, the method including: performing a general software release upgrade of the network element including one or more circuit packs; initializing the one or more circuit packs; checking firmware on the one or more circuit packs; for circuit packs of the one or more circuit packs with a firmware revision below the general software release upgrade, running one or more shadow hardware abstraction layers to communicate between each of the circuit packs and the network element; raising a firmware mismatch for each of the circuit packs with a firmware revision below the general software release upgrade; and sequentially upgrading each circuit pack of the circuit packs with a firmware revision below the general software release upgrade to a firmware revision associated with the general software release upgrade. The method also includes transferring messages that are supported by the circuit packs with a firmware revision below the general software release upgrade between upgraded application software on the network element and the circuit packs through the one or more shadow hardware abstraction layers; and filtering messages that are not supported by the circuit packs with a firmware revision below the general software release upgrade between the upgraded application software and the circuit packs at the one or more shadow hardware abstraction layers. The filtered messages that are not supported by the circuit packs with a firmware revision below the general software release return an exception value to the application software. Upgrading each circuit pack step includes preparing for installation of the firmware revision associated with the general software release upgrade; installing a primary image on a target device comprising one of the circuit packs of the one or more circuit packs with a firmware revision below the general software release upgrade; if the installing a primary image fails, raising an alarm, loading a secondary image on the target device, and operating the target device with a firmware mismatch and the one or more shadow hardware abstraction layers; and loading the primary image on the target device. Upgrading firmware step also includes provisioning the target device with parameters persisted from a previous configuration; and running a hardware abstraction layer associated with the general software release upgrade.

BRIEF DESCRIPTION OF THE DRAWINGS

The present invention is illustrated and described herein with reference to the various drawings, in which reference numbers are used to denote like method steps/system components, as appropriate, and in which:

FIG. 1 (FIGS. 1a-1c) is a schematic diagram illustrating, in one exemplary embodiment, the operation of the shadow hardware abstraction layer (HAL) of the present invention;

FIG. 2 (FIGS. 2a and 2b) is a flow chart illustrating, in one exemplary embodiment, the upgrade of firmware on a circuit pack in accordance with the methods of the present invention;

FIG. 3 (FIGS. 3a and 3b) is a flow chart illustrating, in one exemplary embodiment, a rolling upgrade in accordance with the methods of the present invention.

DETAILED DESCRIPTION OF THE INVENTION

In various exemplary embodiments, the present invention provides methods for maintaining software/hardware backward compatibility across multiple versions in a modular and scalable manner. More specifically, the present invention provides, stacked hardware abstraction layer methods for maintaining software/hardware backward compatibility for networking equipment and the like.

When a release is upgraded, a subsystem installs the new software and non-service affecting firmware for subsystems that require the upgrade. When the upgrade process is started, the system notifies the operator that the upgrade may be service affecting. At this point, the operator may either abort the upgrade or continue.

As part of the upgrade, firmware images are written to the local flash on the target circuit pack, in the case of networking equipment. A copy of the prior firmware image is also maintained in flash in case the upgrade fails. For a non-service affecting upgrade, firmware images are automatically loaded onto the target field programmable device, i.e. Field Programmable Gate Array (FPGA).

A Firmware Mismatch standing condition is raised for circuit packs that have upgraded software installed and pending service affecting firmware upgrades. Provisioning may be limited for devices with pending service affecting firmware upgrades, but backward compatibility is required such that existing services are not impacted.

If a given target device is in the data path, the upgrade is considered to be service affecting. Non-service affecting firmware upgrades (including control FPGA upgrades) occur automatically when the Network Element (NE) release is upgraded.

A special case of firmware upgrade may exist for some control level firmware. Examples include, but are not limited to, devices that control communications between hardware elements. In such a case, the firmware is upgraded automatically with the release upgrade and is service affecting for the equipment.

The two methods of the present invention for a service-affecting firmware upgrade include a circuit pack upgrade and a shelf upgrade. Both methods are manually initiated. The circuit pack upgrade is performed on the circuit pack equipment and installs all pending firmware upgrades on the given circuit pack. The shelf upgrade is performed on the channel shelf equipment and initiates a rolling firmware upgrade on all circuit pack equipment in the given shelf.

A level of backward compatibility must be maintained when the installed firmware version is not current and is older that the firmware packaged with the new release. This backward compatibility is achieved by maintaining "shadows" of the hardware abstraction layer (HAL) for each of the previous releases. The HAL typically provides an interface between the application objects (states, attribute sets and gets, for example) and the driver level (interrupt handling, register reads and writes, for example).

The shadow HAL ensures that only the messages supported by the old firmware are transferred between the hardware and software application. The remaining threads are filtered by the shadow HAL. As a general rule, the firmware version read registers and the firmware loading interface to the device must be supported by each layer or version of the shadow HAL.

Figure 1A:
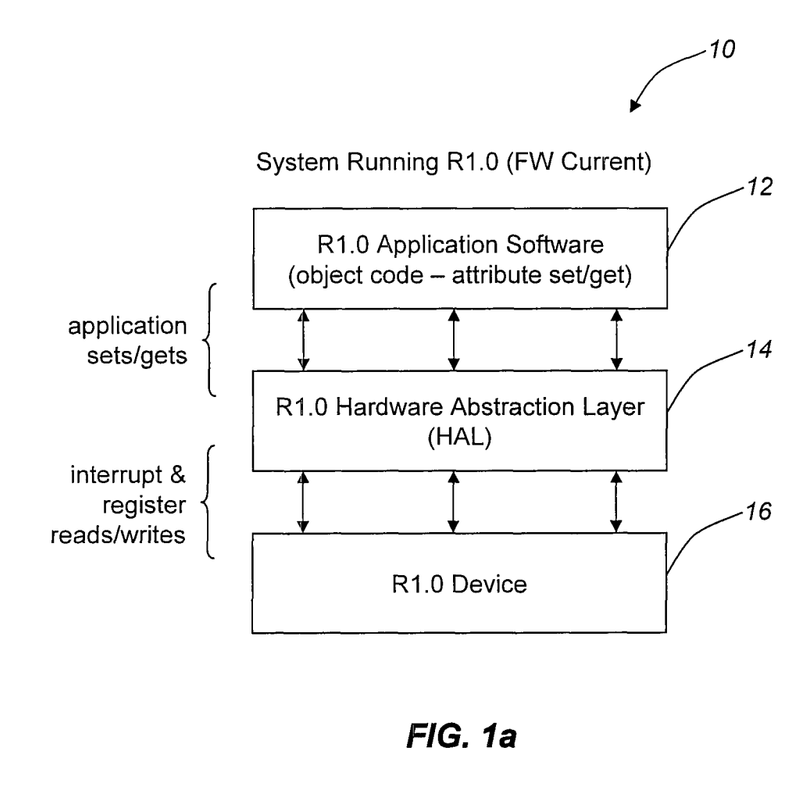
Figure 1B:
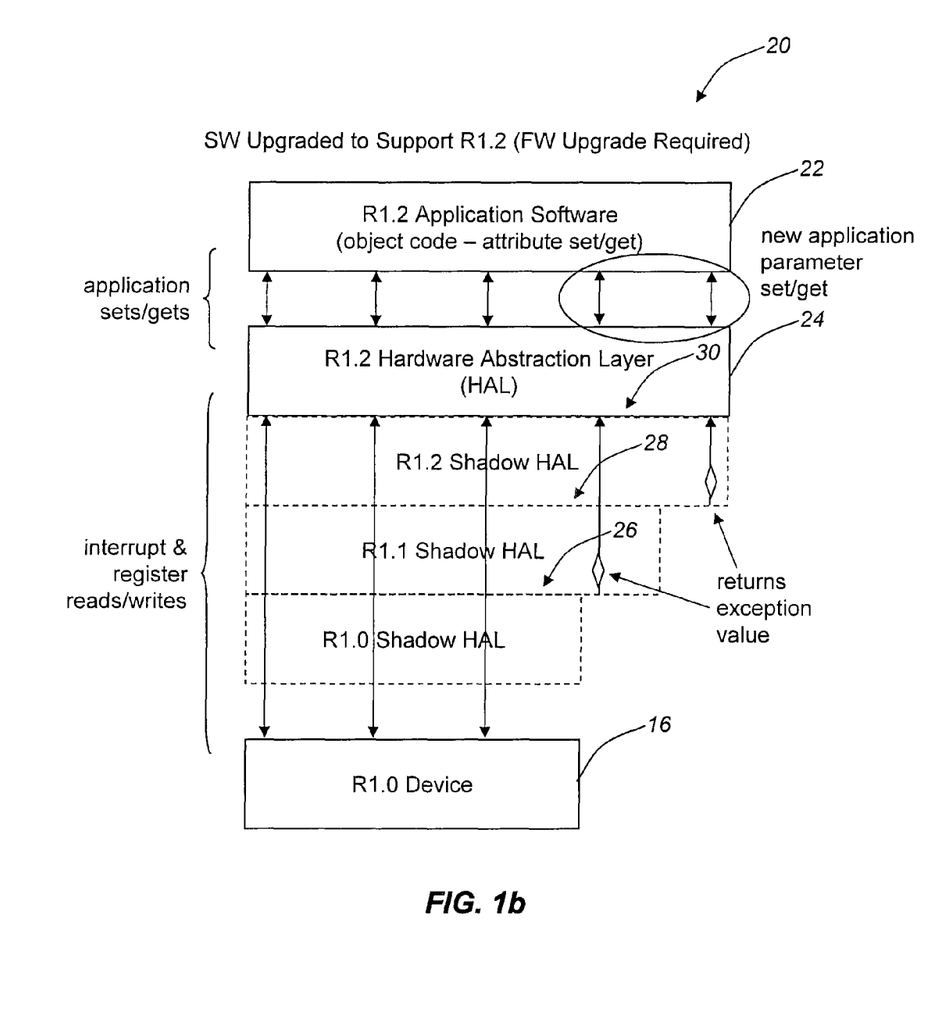
Figure 1C:
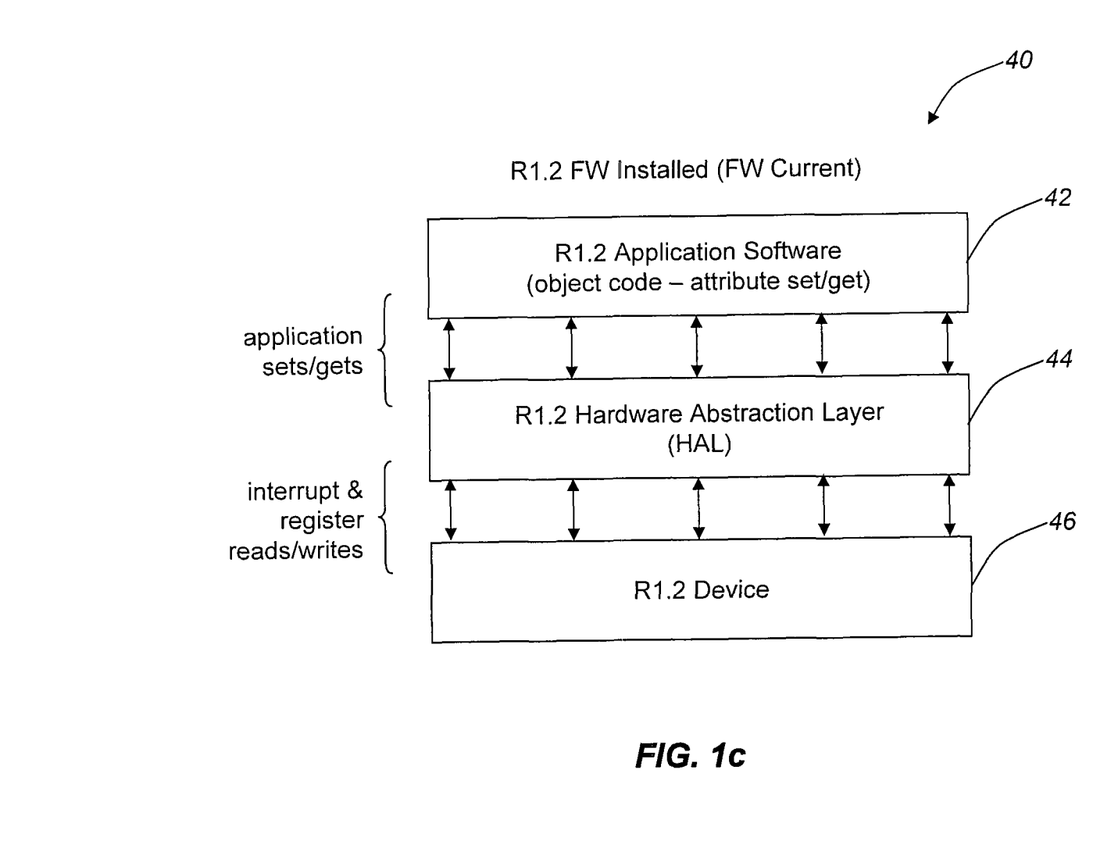

FIG. 1 is a schematic diagram illustrating, in one exemplary embodiment, the operation of the shadow HAL of the present invention. Referring specifically to FIG. 1a, the system 10 is running release 1.0 and the firmware is current. The system 10 includes release 1.0 application software 12 and a release 1.0 HAL 14. Thus, the system 10 includes a release 1.0 device 16. Referring specifically to FIG. 1b, the system 20 is running release 1.2 and the firmware must be upgraded. The system 20 includes release 1.2 application software 22 and a release 1.2 HAL 24. The system 20 also includes a release 1.0 shadow HAL 26, a release 1.1 shadow HAL 28, and a release 1.2 shadow HAL 30 that collectively ensure that only the messages supported by the old firmware are transferred between the hardware and software application. The remaining threads are filtered by the shadow HALS 26, 28, 30. Thus, the system 20 still includes a release 1.0 device 16. Referring specifically to FIG. 1c, the system 40 is running release 1.2 and the firmware is now current. The system 40 includes release 1.2 application software 42 and a release 1.2 HAL 44. Thus, the system 40 now includes a release 1.2 device 46.

Forward compatibility is typically not supported. If the firmware is current and a downgrade is performed, the corresponding software downgrade is always concurrent with the firmware downgrade. This is service affecting for the duration of the firmware install.

FIG. 2 is a flow chart illustrating, in one exemplary embodiment, the upgrade of firmware on a circuit pack in accordance with the methods of the present invention. In general, firmware images are loaded into flash on the appropriate modules when the general release upgrade is performed, but this does not include the installation of firmware images on active (i.e. traffic bearing) modules. Rather, these modules boot with limited availability on their facilities and a firmware mismatch condition. The firmware mismatch condition persists until the firmware is manually installed on the modules. When a firmware upgrade command is given to the circuit pack equipment, the upgrade process is initiated on the given module, installing all of the pending firmware upgrades on the module. Failure to install due to bad CRCs or PIF time-outs initiates initiate a retry. Failure to install after the retry raises a Replaceable Unit Problem (RUP) alarm against the module, and the system attempts to revert to the old (i.e. secondary) image—leaving the firmware state in InstallRequired. Additional text describing the details of the failure always accompanies a RUP alarm.

Figure 2A:
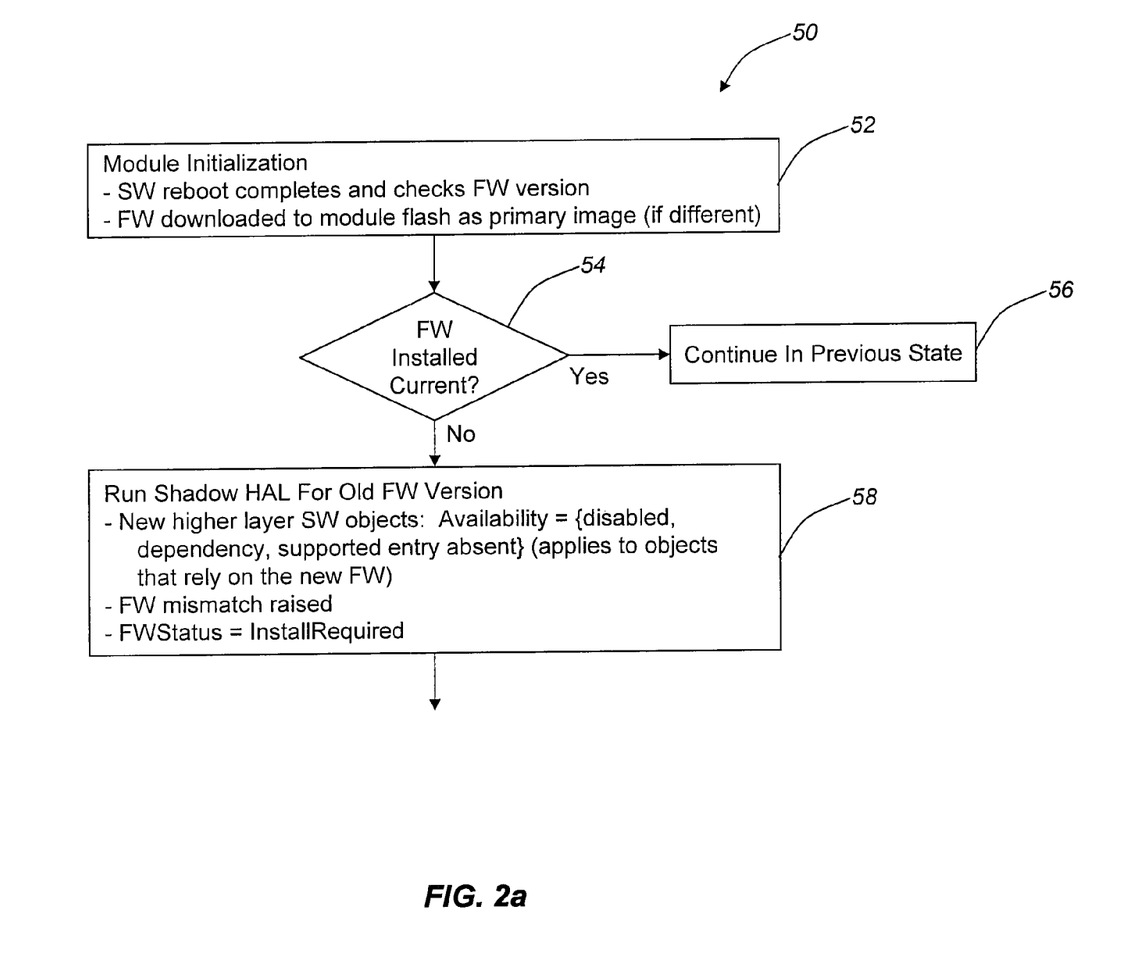

Referring specifically to FIG. 2a, illustrating processes that run system wide, as opposed to on a single circuit pack, the upgrade of firmware on a circuit pack 50 begins with module initialization 52, including a software reboot and a check of the firmware version. If the installed firmware is current 54, operation is continued in the previous state 56. If the installed firmware is not current 54, a shadow HAL is run for the old firmware version 58. At this point, a firmware mismatch is raised and the FWStatus equals InstallRequired.

Figure 2B:
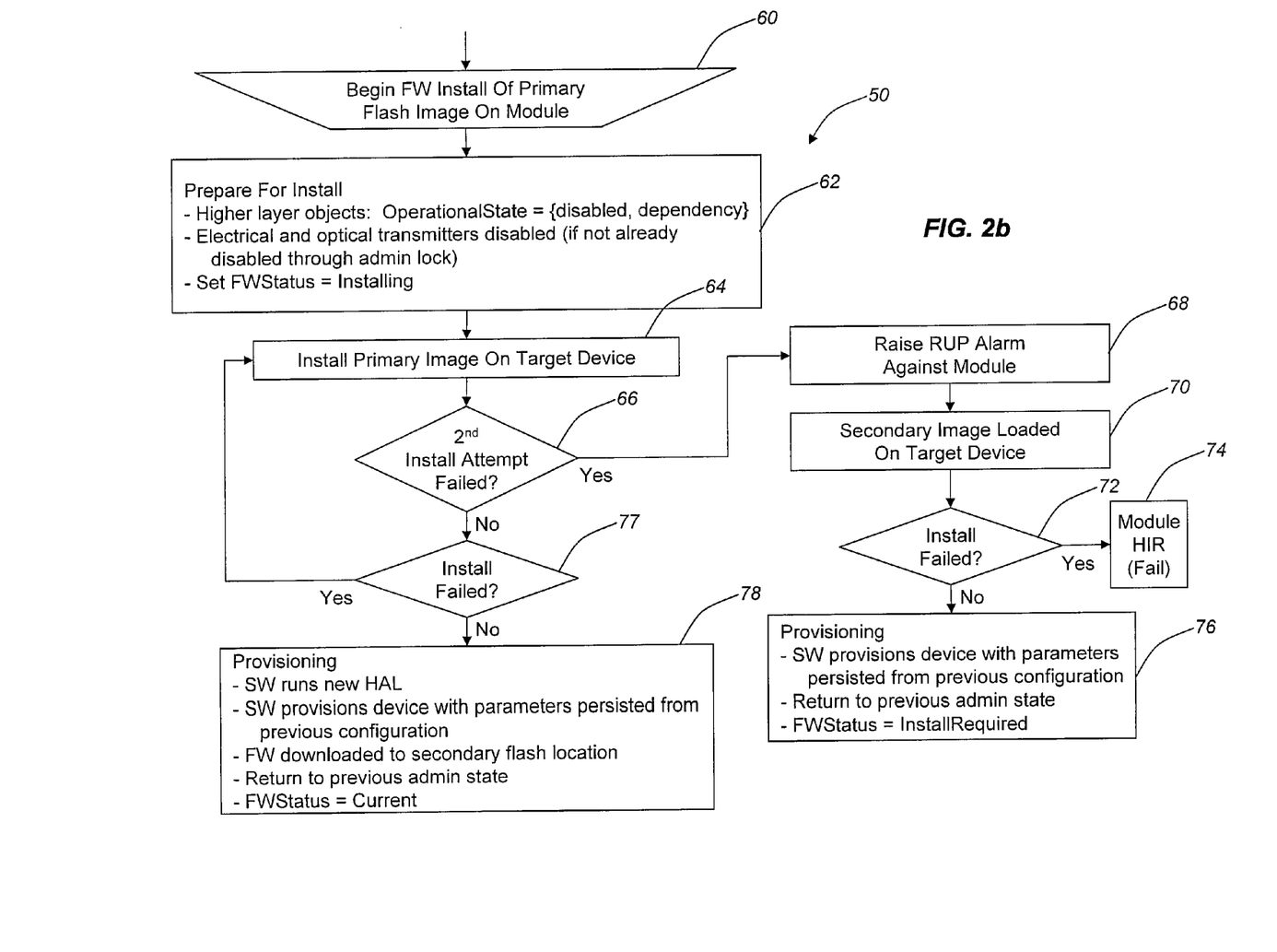

Referring specifically to FIG. 2b, illustrating processes that run on a single circuit pack, as opposed to system wide, the upgrade of firmware on a circuit pack 50 continues with the installation of the primary flash image on the given module 60 and preparation for installation 62, including the disabling of previously non-disabled electrical and optical transmitters and the setting of FWStatus to Installing. At this point, the primary flash image is installed on the given module 64. If this installation fails on a second attempt 66, a RUP alarm is raised against the module 68 and a secondary firmware image is installed on the module 70. If this installation fails 72, the module Hold in Reset (HIR) equals Fail 74. If this installation does not fail 72, provisioning takes place 76, including the software provisioning the module with parameters persisted from the previous configuration, a return to the previous administrative state, and FWStatus equaling InstallRequired. If this installation does not fail on a second attempt 66, provisioning also takes place 78, including the software running the new HAL, the software provisioning the module with parameters persisted from the previous configuration, the firmware downloaded to a secondary flash location, a return to the previous administrative state, and FWStatus equaling Current.

FIG. 3 is a flow chart illustrating, in one exemplary embodiment, a rolling upgrade in accordance with the methods of the present invention. When a firmware upgrade command is issued to the shelf equipment, it initiates the firmware upgrade process on all of the modules in the shelf in a rolling fashion, such that only one module is disabled by the firmware upgrade at any given time. This process is similar to upgrading a single circuit pack, except that the system waits for the process to complete and subsequently proceeds to upgrade the next eligible equipment. The system rolls through the eligible slots based on lowest to highest slot ID.

Figure 3A:
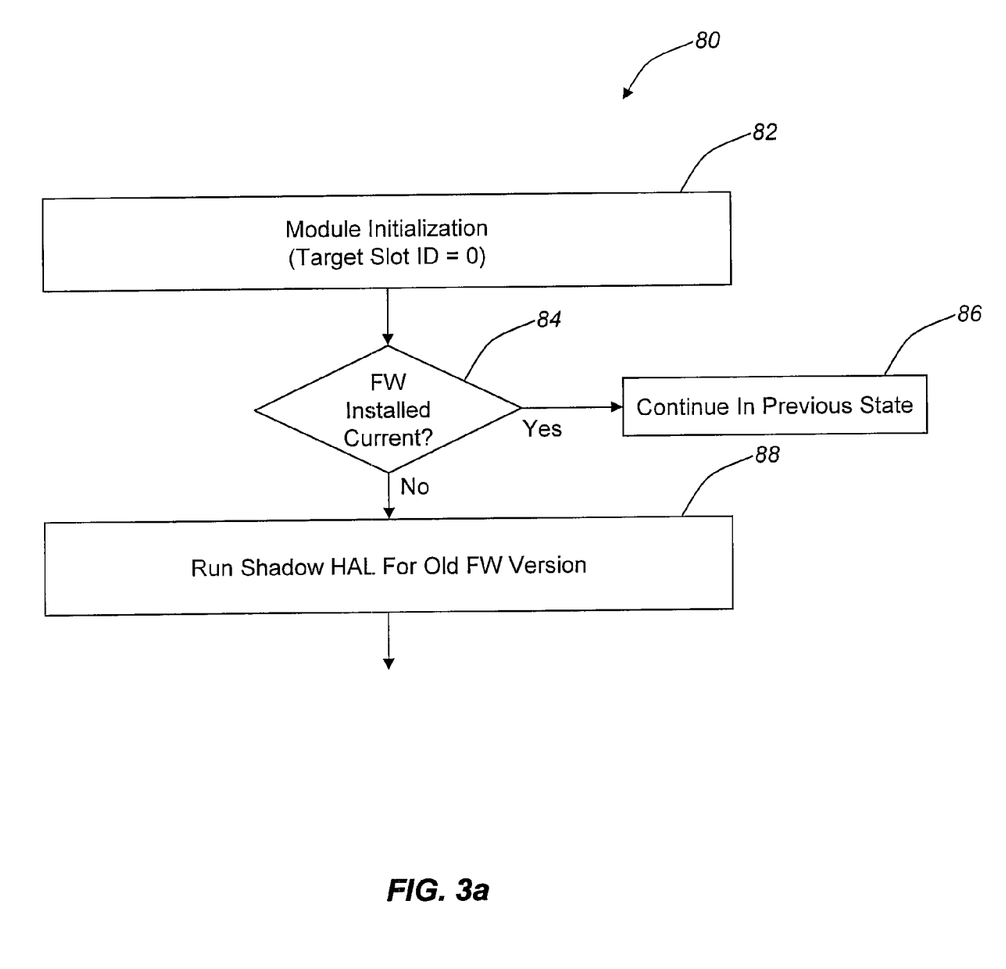

Referring specifically to FIG. 3a, illustrating processes that run system wide, the rolling upgrade 80 begins with module initialization 82 for TargetSlotID equal to 0. If the installed firmware is current 84, operation is continued in the previous state 86. If the installed firmware is not current 84, a shadow HAL is run for the old firmware version 88.

Figure 3B:
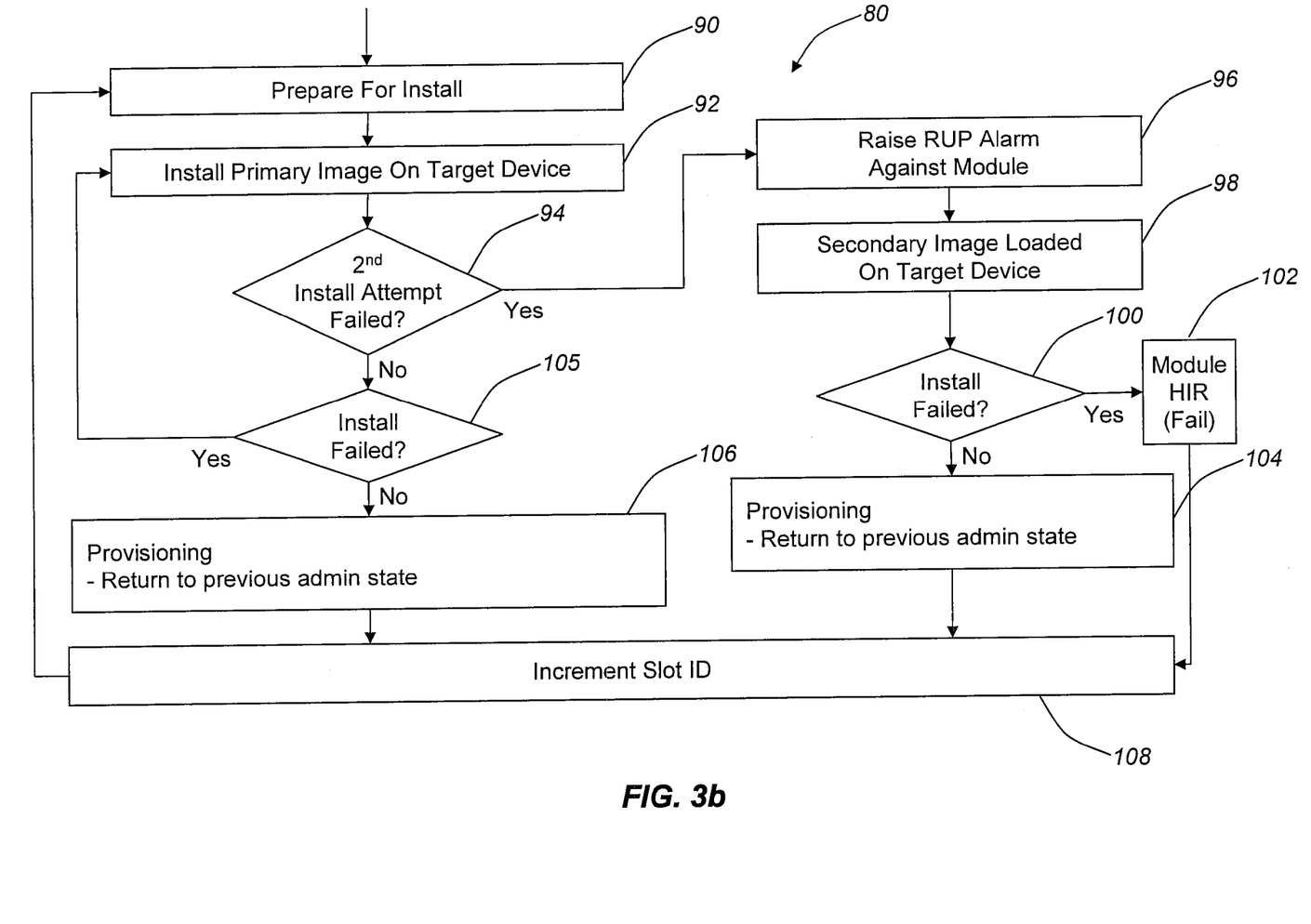

Referring specifically to FIG. 3b, the rolling upgrade 80 continues with preparation for installation 90, At this point, the primary flash image is installed on the given module 92. If this installation fails on a second attempt 94, a RUP alarm is raised against the module 96 and a secondary firmware image is installed on the module 98. If this installation fails 100, the module HIR equals Fail 102. If this installation does not fail 100, provisioning takes place 104, including a return to the previous administrative state. If this installation does not fail on a second attempt 94, provisioning also takes place 106, including a return to the previous administrative state. After module HIR (fail) 102 or either provisioning process 104, 106, TargetSlotID is incremented 108 and the entire process is repeated.

Figure 4:
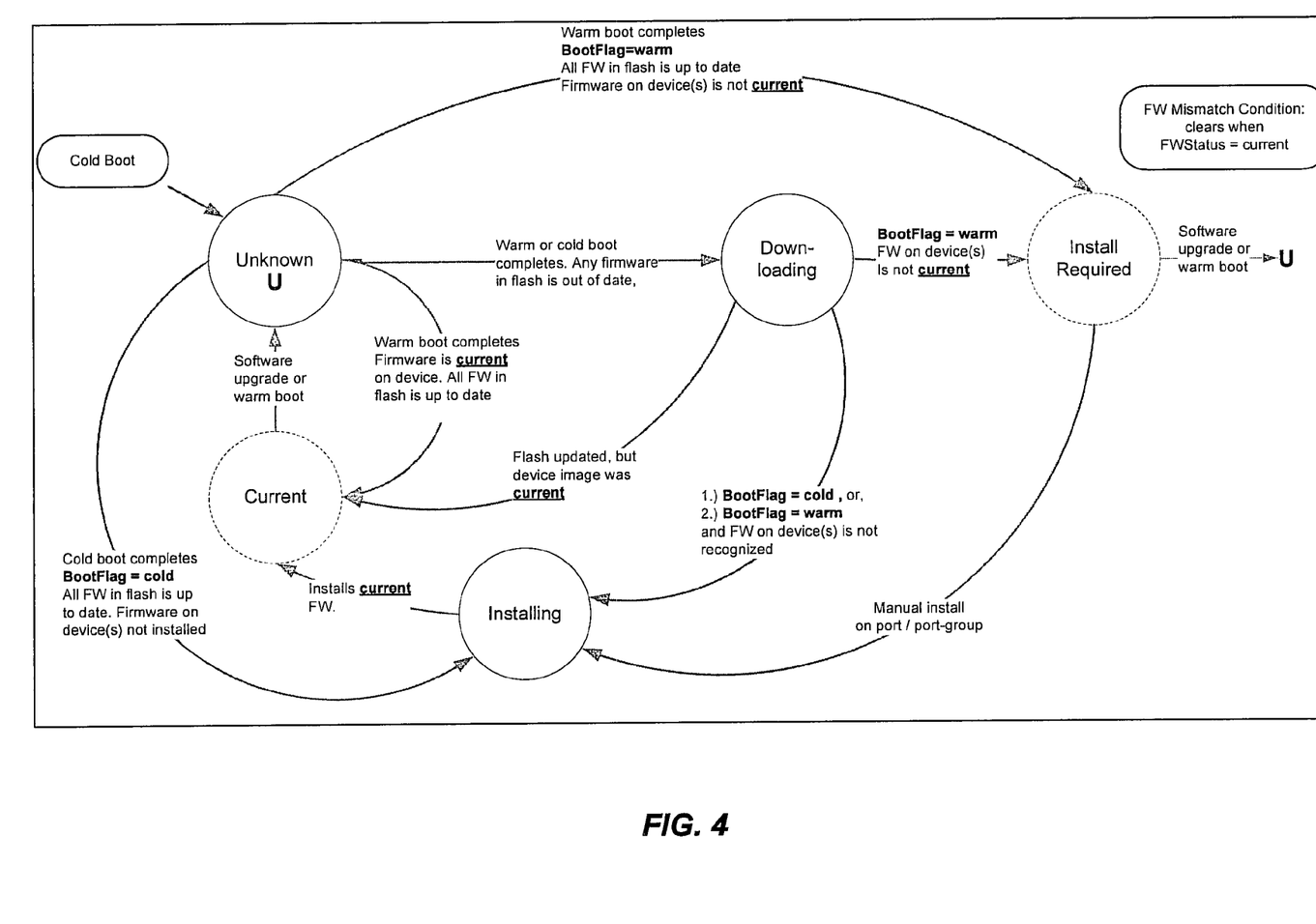
FIG. 4 is a schematic diagram illustrating, in one exemplary embodiment, how the FirmwareStatus changes from one state to another in accordance with the methods of the present invention.

In general, the state of the firmware on a given circuit pack is defined by FirmwareStatus. FirmwareStatus::=set of integer {Unknown(0), DownloadRequired(1), Loading(2), InstallRequired(3), Installing(4), Current(5)}. A FirmwareStatus of Unknown applies to provisioned circuit packs that are uninstalled or initializing, or, more generally, where communications cannot be established with the circuit pack and the firmware version cannot be queried. A FirmwareStatus of DownloadRequired applies to certain legacy cards on the system. In the case of these certain legacy cards, a DownloadRequired status exists when the firmware stored on the system is a more recent version than the version stored on the card. The status changes to Loading when the download is initiated. The DownloadRequired status does not apply to some circuit packs, as these circuit packs download firmware images to flash as part of the software upgrade procedure. A circuit pack has a FirmwareStatus of Loading while firmware is being downloaded to the circuit pack. A FirmwareStatus of InstallRequired applies only to service-affecting firmware upgrades. The status of InstallRequired is present after software has been installed and the new firmware image has been successfully downloaded to the circuit pack. The InstallRequired status implies a firmware mismatch condition on the target circuit pack. Initiating installation of the firmware on the target circuit pack transitions the FirmwareStatus to Installing. A circuit pack will have a FirmwareStatus of Installing while firmware is being installed on the circuit pack. A circuit pack has a FirmwareStatus of Current if both the installed and locally-stored firmware for all programmable devices matches the firmware version packaged with the installed release. FIG. 4 illustrates how the FirmwareStatus changes from one state to another.

The operational state and availability of supported (i.e. higher layer) objects is affected differently in different stages of the upgrade process depending on the status of the supporting firmware. Objects typically affected are those that provide services, such as service interfaces, connections, and terminations.

The shadow HAL allows dependent pre-existing higher layer objects to operate in an Enabled state while a firmware mismatch condition exists—i.e. when the firmware status is not Current. The shadow HAL allows the programmable device to continue operating in its previous configuration, but may limit the read/write capability to the programmable device. The degree of backward compatibility while in a degraded state depends on the specific case. New higher layer objects (i.e. those not supported in the old firmware) have an operational state of Disabled, with availability of Dependency, SupportedEntityAbsent. The firmware version determines the shadow HAL layer and, therefore, the level of backward compatibility.

When the firmware status for supporting equipment is Installing, the operational state for higher layer objects is always Disabled, with availability of Dependency.

Table 1 describes the firmware status and facility operational availability state transitions.

TABLE 1

Equipment and facility State Transitions

| Initial States | | | | Final States | | | |
|---|---|---|---|---|---|---|---|
| | Higher Layer Object's State* | | | | Higher Layer Object's State* | | |
| FW Status | Old Objects | New Objects | Event | FW Status | Old Objects | New Objects | Comments |
| unknown | unknown | unknown | card cold boots or power cycles. Installs SW. FW version different than installed, and not in FreezeList - running shadow HAL for old FW | download | enabled or disabled (no change) | disabled, dependency | Any new dependent higher layer object is disabled. Reset Flag is set to cold boot. System is running shadow HAL. FW mismatch standing condition raised. |
| download | enabled or disabled | disabled, dependency | FW download completes. Reset Flag is set to cold boot. Provision FW is automatic installed on target device. | install | disabled, depend. | disabled, dependency | Target device initializing. |
| current | enabled or disabled | NA | SW upgrade started | unknown | unknown | unknown | |
| unknown | unknown | unknown | SW upgrade completes. FW version different than installed, and not in FreezeList - running shadow HAL for old FW. | download | enabled or disabled (no change) | disabled, dependency | Any new dependent higher layer object is disabled. Reset Flag is set to warm boot. System is running shadow HAL. FW mismatch standing condition raised. |

TABLE 1-continued

Equipment and facility State Transitions

| | Initial States | | | | Final States | | |
| --- | --- | --- | --- | --- | --- | --- | --- |
| | | Higher Layer Object's State* | | | | Higher Layer Object's State* | |
| FW Status | Old Objects | New Objects | Event | FW Status | Old Objects | New Objects | Comments |
| download | enabled or disabled | disabled, dependency | FW download to modules. FW download completes. Reset Flag is set to warm boot. | install required | enabled or disabled | disabled, dependency (no change) | FW mismatch standing condition raised. |
| install required | enabled or disabled | disabled, dependency | initiate FW upgrade | install | disabled, depend. | disabled, dependency | FW mismatch standing condition raised. Target device initializing. |
| install | disabled, depend. | disabled, dependency | successful install | current | enabled or disabled (dep. on cond.) | enabled or disabled (dep. on cond.) | Device interrogated for new states. |
| download required | enabled or disabled | disabled, dependency, supported entity absent | new SW installed, FW download initiated | download | enabled or disabled | disabled, dependency (no change) | Legacy only. |
| download | enabled or disabled | disabled, dependency, supported entity absent | FW download complete | install required | enabled or disabled | disabled, dependency (no change) | Legacy only. |

Advantageously, the present invention provides software backward compatibility to old firmware in a scalable way such that an arbitrary number of back-releases of firmware can be supported. The stacked HALs are configured to shadow legacy behavior, and to filter threads that are not supported by the old firmware. This allows firmware on circuit packs to be upgraded individually so that traffic can be switched to protect ports, e.g. on different circuit packs, during upgrade. Additionally, the present invention can support a method of rolling upgrade of firmware such that traffic can automatically switch to protect ports during upgrade.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A stacked hardware abstraction layer method for maintaining software/hardware backward compatibility for networking equipment and the like, the method comprising:
given application software and a hardware abstraction layer associated with a newer release and a device comprising firmware associated with an older release, providing one or more shadow hardware abstraction layers for each intervening release, wherein a loading interface of the firmware is supported by each of the one or more shadow hardware abstraction layers, and wherein the hardware abstraction layer comprises an interface between the application software and the firmware enabling the application software to interface to the firmware at an abstract level;
transferring messages that are supported by the older release between the application software and the device through the one or more shadow hardware abstraction layers;
filtering messages that are not supported by the older release and not transferring the messages between the application software and the device at the one or more shadow hardware abstraction layers; and
thereby upgrading the firmware of the device to the newer release.

2. The method of claim 1, wherein the filtered messages that are not supported by the older release return an exception value to the application software and the hardware abstraction layer associated with the newer release.

3. The method of claim 2, further comprising switching traffic on the device to protect ports prior to upgrading the firmware of the device to the newer release.

4. A method for the upgrade of firmware on one or more circuit packs, the method comprising:
performing a general software release upgrade of a network element comprising one or more circuit packs, wherein the general software release upgrade comprises loading firmware images on one or more modules;
booting the one or more circuit packs;
checking firmware on the one or more circuit packs;
for circuit packs of the one or more circuit packs with a firmware revision below the general software release upgrade, running one or more shadow hardware abstraction layers to communicate between each of the circuit packs and the network element;

raising a firmware mismatch for each of the circuit packs with a firmware revision below the general software release upgrade;

transferring messages that are supported by the circuit packs with a firmware revision below the general software release upgrade between upgraded application software on the network element and the circuit packs through the one or more shadow hardware abstraction layers; and filtering messages that are not supported by the circuit packs with a firmware revision below the general software release upgrade and not transferring the messages between the upgraded application software and the circuit packs at the one or more shadow hardware abstraction layers;

wherein a loading interface of the firmware is supported by each of the one or more shadow hardware abstraction layers, and wherein the one or more shadow hardware abstraction layers are part of a hardware abstraction layer that comprises an interface between the application software and the firmware enabling the application software to interface to the firmware at an abstract level.

5. The method of claim 4, wherein the filtered messages that are not supported by the circuit packs with a firmware revision below the general software release return an exception value to the application software.

6. The method of claim 4, further comprising:
operating the circuit packs with a firmware revision below the general software release upgrade with limited availability on traffic facilities.

7. The method of claim 4, further comprising:
upgrading firmware on each of the circuit packs of the one or more circuit packs with a firmware revision below the general software release upgrade to a firmware revision associated with the general software release upgrade.

8. The method of claim 7, further comprising:
removing the firmware mismatch condition that persists following the upgrading firmware step.

9. The method of claim 7, wherein the upgrading firmware step comprises:
preparing for installation of the firmware revision associated with the general software release upgrade;
installing a primary image on a target device comprising one of the circuit packs of the one or more circuit packs with a firmware revision below the general software release upgrade;
if the installing a primary image fails, raising an alarm, loading a secondary image on the target device, and operating the target device with a firmware mismatch and the one or more shadow hardware abstraction layers; and
loading the primary image on the target device.

10. The method of claim 9, wherein if the installing a primary image fails, retrying the installing a primary image step.

11. The method of claim 9, wherein the upgrading firmware step further comprises:
provisioning the target device with parameters persisted from a previous configuration; and
running a hardware abstraction layer associated with the general software release upgrade.

12. The method of claim 9, wherein preparing for installation comprises:
disabling higher layer objects;
disabling electrical and optical ports; and
setting firmware status to installing.

13. A rolling upgrade method for firmware on one or more circuit packs in a network element, the method comprising:
performing a general software release upgrade of the network element comprising one or more circuit packs;
initializing the one or more circuit packs;
checking firmware on the one or more circuit packs;
for circuit packs of the one or more circuit packs with a firmware revision below the general software release upgrade, running one or more shadow hardware abstraction layers to communicate between each of the circuit packs and the network element;
raising a firmware mismatch for each of the circuit packs with a firmware revision below the general software release upgrade;
sequentially upgrading each circuit pack of the circuit packs with a firmware revision below the general software release upgrade to a firmware revision associated with the general software release upgrade;
transferring messages that are supported by the circuit packs with a firmware revision below the general software release upgrade between upgraded application software on the network element and the circuit packs through the one or more shadow hardware abstraction layers; and
filtering messages that are not supported by the circuit packs with a firmware revision below the general software release upgrade and not transferring the messages between the upgraded application software and the circuit packs at the one or more shadow hardware abstraction layers;
wherein a loading interface of the firmware is supported by each of the one or more shadow hardware abstraction layers, and wherein the one or more shadow hardware abstraction layers are part of a hardware abstraction layer that comprises an interface between the application software and the firmware enabling the application software to interface to the firmware at an abstract level.

14. The method of claim 13, wherein the filtered messages that are not supported by the circuit packs with a firmware revision below the general software release return an exception value to the application software.

15. The method of claim 13, wherein the upgrading each circuit pack step comprises:
preparing for installation of the firmware revision associated with the general software release upgrade;
installing a primary image on a target device comprising one of the circuit packs of the one or more circuit packs with a firmware revision below the general software release upgrade;
if the installing a primary image fails, raising an alarm, loading a secondary image on the target device, and operating the target device with a firmware mismatch and the one or more shadow hardware abstraction layers; and
loading the primary image on the target device.

16. The method of claim 15, wherein if the installing a primary image fails, retrying the installing a primary image step.

17. The method of claim 15, wherein the upgrading firmware step further comprises:
provisioning the target device with parameters persisted from a previous configuration; and
running a hardware abstraction layer associated with the general software release upgrade.

18. The method of claim 15, wherein preparing for installation comprises:
    disabling higher layer objects;
    disabling electrical and optical ports; and
    setting firmware status to installing.

19. The method of claim 1, wherein the hardware abstraction layer comprises an interface between objects associated with the application software and a driver level associated with the firmware of the device.

20. The method of claim 1, wherein the one or more shadow hardware abstraction layers are part of the hardware abstraction layer, and the one or more shadow hardware abstraction layers are used to ensure only supported messages by the firmware are transferred between the application software and the device.

* * * * *